United States Patent

Sasan

[11] Patent Number: 5,870,195
[45] Date of Patent: Feb. 9, 1999

[54] METHOD AND SYSTEM FOR DETERMINING THE DISTANCE BETWEEN OPTICAL FIBRES

[75] Inventor: Esmaeili Sasan, Solna, Sweden

[73] Assignee: Telefonaktiebolaget L M Ericsson, Stockholm, Sweden

[21] Appl. No.: 710,118

[22] Filed: Sep. 12, 1996

[30] Foreign Application Priority Data

Sep. 29, 1995 [SE] Sweden ................................. 9503364

[51] Int. Cl.⁶ .................................................. G01B 9/02
[52] U.S. Cl. .......................... 356/355; 356/345; 356/73.1
[58] Field of Search ................................... 356/345, 355, 356/357, 73.1; 385/95, 97, 98

[56] References Cited

U.S. PATENT DOCUMENTS 3,518,007  6/1970  Ito ............................................. 356/357
5,011,259  4/1991  Lieber et al. .
5,323,225  6/1994  Dyott .

*Primary Examiner*—Frank G. Font
*Assistant Examiner*—Robert Kim
*Attorney, Agent, or Firm*—Burns, Doane, Swecker & Mathis, L.L.P.

[57] ABSTRACT

With the objective of simplifying the splicing of optical fibres and obtaining a very high degree of accuracy in the positional setting of the fibre ends prior to splicing the ends together fully automatically, the relative positions of the fibre ends are determined with the aid of laser light diffraction. By illuminating the fibre ends (1, 2) with laser light (3) and studying the image of the diffraction pattern on a display screen (6), which pattern can be related directly to the perpendicular distance between the fibre ends and the relative offset between the geometric axes of the ends, it is possible to determine the distance between the fibre ends by direct image analysis. A suitable splicing distance between the gap between the fibre ends can then be adjusted automatically to a value suitable for splicing, with regard to fibre material and fibre dimensions.

11 Claims, 4 Drawing Sheets

METHOD AND SYSTEM FOR DETERMINING THE DISTANCE BETWEEN OPTICAL FIBRES

TECHNICAL FIELD

The present invention relates to a method of determining distance and offset between two mutually opposing optical fibre (fiber) ends, and to a system for determining the distance between two mutually opposing optical fibre ends and their relative offset, and to a fibre splicing machine. When splicing optical fibres where one end of an optical fibre is to be joined to one end of another optical fibre such as to form an homogenous splice, it is necessary first to determine the distance between the fibre ends and their relative offset. Depending on the fibre material and its dimensions and also on any possible deviation from a recommended value, it is then necessary to adjust the distance and relative offset between the fibre ends to a given value in order for the splice between the fibre ends to be homogenous with minimum damping after the splice has been made.

DESCRIPTION OF THE BACKGROUND ART

It is known to use optical instruments for splicing or bonding optical fibres, for instance instruments such as cameras equipped with microscope objectives, to determine the relative offset of and the distance between the fibre ends, computers provided with display screens for monitoring and controlling the fibre splicing process, means for adjusting and setting the positions of the fibre ends, and means for fusing the fibre ends together. When the camera is coupled to the computer via an image transmitter, an enlarged image of the fibre ends can be produced on the computer screen and the correct distance and offset between the fibre ends with respect to fibre material and dimensions can be adjusted automatically, so as to obtain a splice that has optical properties. Subsequent to having aligned the fibres and set the distance between the fibre ends, the fibre ends may be fused together with the aid of a light arc generated with the aid of high-voltage electrodes, so as to form an homogenous splice.

U.S. Pat. No. 5,323,225 discloses a method of determining the positions of transverse axes of an optical fibre that has an elliptical core. The fibre is illuminated with coherent light such as to produce an interference pattern which, when studied, is able to disclose optimal positioning of the fibre ends for obtaining a correct fibre bond or splice.

SUMMARY OF THE INVENTION

Laser beam diffraction has been used in determining the positions of optical fibres with the intention of facilitating splicing of said fibres while, nevertheless, achieving a very high degree of accuracy in positioning the fibre ends prior to automatic splicing of said ends. By illuminating the fibre ends with a laser beam and studying an imaged diffraction pattern which can be related directly to the orthogonal distance between the fibre ends and the relative offset between the geometric axes of said fibre ends, the distance between the fibre ends can be determined directly by image analysis. The fibre ends are then automatically adjusted to positions suitable for splicing, with respect to fibre material and dimensions.

In addition to determining the gap or distance between the two mutually opposing optical fibre ends and the relative offset therebetween, the use of laser beam diffraction for determining the position of said fibre ends also enables the directional sense of this offset to be determined. Solely one laser beam need be used, without dividing the beam, and the diffraction lines can be read in one observation plane.

In this case, diffraction of laser light from an opening, such as a gap, between two mutually opposing transparent cylindrical rods of small dimensions, such as optical fibres, is used as an interferometric method for accurate determination of the relative distance between two objects, such as the mutually opposing ends of optical fibres in the present case, as shown in FIG. 1A. FIG. 1B illustrates schematically a diffraction pattern having diffraction lines on an observation plane from two illuminated fibre ends spaced apart by gap $\Delta z$ and the relative offset $\Delta x$ and $\Delta y$, where the distances or spacings between the diffraction lines can be related directly to the distance between the fibre ends, and the slope of the lines can be related directly to said offset.

The gap between two transparent cylindrical rods, such as two optical fibre ends 1, 2, is illuminated with monochromatic light and coherent light. Part of the light incident on the cylinder ends is diffracted and spreads perpendicularly to the axes of said cylinders. This can be observed as a vertical line of light in the centre of an observation plane, as shown in FIG. 2, which shows a true image of a diffraction pattern from two mutually concentrical, transparent fibre ends. This occurs in full agreement with the refraction laws and geometric optics. However, the lateral extension of the light immediately adjacent the end surfaces of the cylinders is disturbed at the transition point from air to cylinder material/ fibre material, which has a refraction index different to that of air, on the front side and cylinder material/fibre material to air on the rear side of the cylinder/fibre. Part of the light waves within the cylinder/fibre are totally reflected towards the delimiting end surface. Another part of the light waves, which propagate straight forwards close to the end surface, bend laterally at the air transition point on the rear side of the cylinder/fibre. Thus, there are formed two secondary light fields which have mutually different phase conditions. A superposition of these fields from two mutually opposing cylinder ends/fibre ends will form a characteristic diffraction pattern with mutually parallel dark and light lines along a full observation plane and can be reproduced as such on a display screen.

The intensity distribution of the interfering light on a screen, the so-called observation plane placed behind the opening/gap, is a function of the geometric position of the cylinder ends/fibre ends, and the amplitude and phase of the incident light. Knowledge of the electric field of the incident light at the gap between said ends enables the diffraction pattern to be described mathematically as a function of the gap and the relative offset in two mutually perpendicular x and y directions.

As evident from FIGS. 3A, B, the intensity change of the diffraction pattern as a function of the geometric change in the gap or opening is manifested in the form of regular changes in the angles of the diffraction lines, said Figures showing diffraction lines from two eccentrically positioned fibre ends. In FIG. 3A, the offset is perpendicular to the laser beam, while in FIG. 3B the offset is along said laser beam.

By reading the slope $\theta$ of the diffraction lines in two separate picture windows located in the same observation plane, it is possible to determine the absolute position of the cylinder ends in a cylindrical coordinate system to a high degree of accuracy and resolution. This determination of the position of said cylinder ends can be effected automatically and is utilized to position the fibre ends correctly prior to splicing said ends together, and may also be included in a fibre splicing machine.

DETAILED DESCRIPTION OF A PREFERRED EMBODIMENT

Figures 1A, 1B:
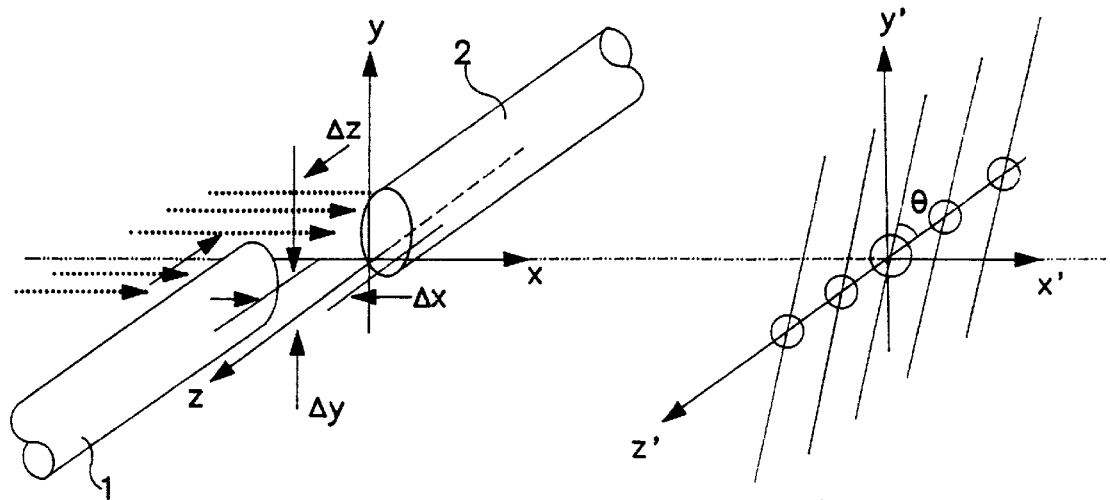
FIG. 1A illustrates schematically two mutually oppose and mutually offset fibre ends.
FIG. 1B illustrates a diffraction pattern formed from the fibre ends in FIG. 1A having the relative offset Δx and Δy.
Figure 4:
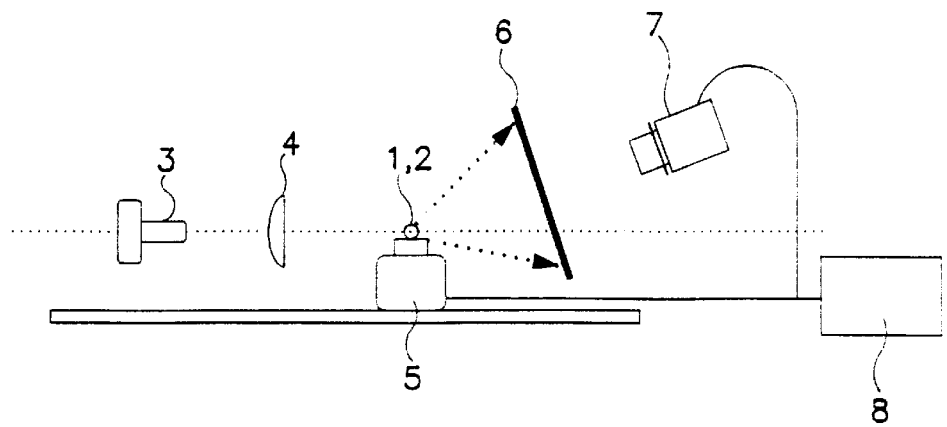
FIG. 4 illustrates schematically a system for measuring the distance between two transparent fibre ends with the aid of diffraction in accordance with the invention, and means for positioning the fibre ends.

FIG. 4 illustrates schematically a conceivable position determining system according to the invention which uses laser light diffraction from two transparent cylinder ends/fibre ends 1, 2. The system uses a light source 3, for instance a diode laser, to obtain perpendicularly incident, monochromic, coherent and polarized light. The light beam is focused by means of a lens 4 placed between the light source 3 and the fibre ends 1, 2. Translators 5 are included for moving the fibre ends 1, 2. A semi-transparent screen 6 coated with an incoherent layer is provided for imaging the diffraction pattern. The illustrated system also includes a CCD camera 7 having an objective lens connected to a frame grabber, for registering the diffraction pattern. A computer 8 is provided for controlling translators, possible splicing process and image processes, including evaluation of the diffraction patterns and possible storage of the actual values obtained and control or set point values.

Figure 5:
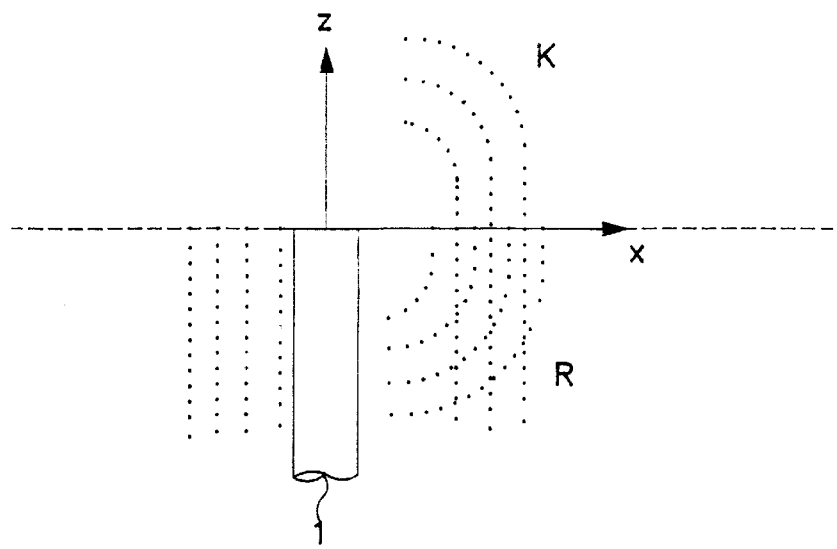
FIG. 5 is a schematic illustration of two secondary fields formed after diffraction of the light through a transparent fibre with the waves projected in the xz-plane.
Figure 2:
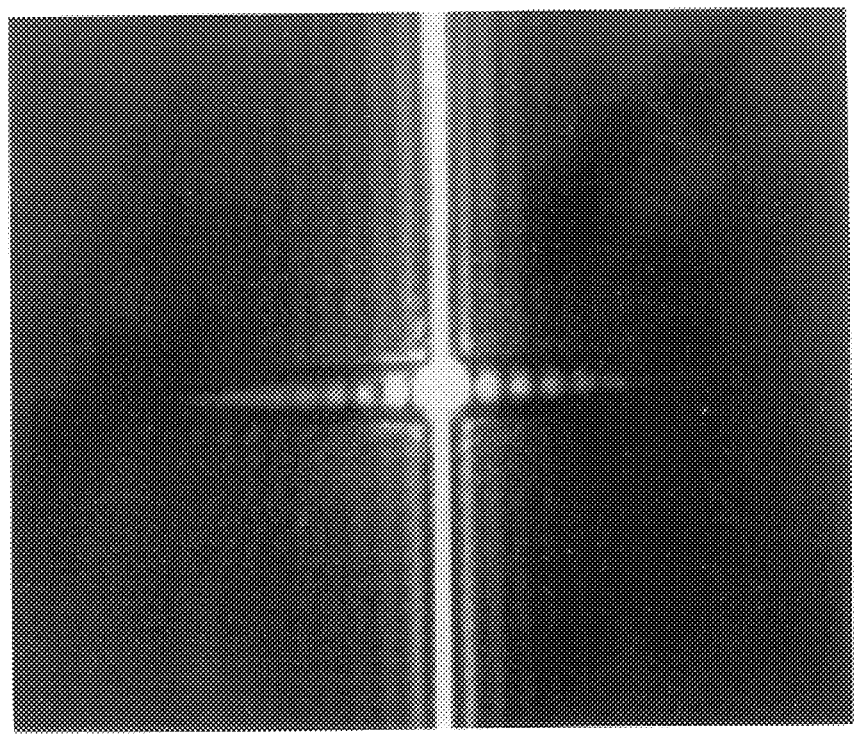
FIG. 2 is an actual picture of a diffraction pattern formed from two mutually opposing and mutually concentrical transparent fibre ends spaced a small distance apart.
Figure 3A:
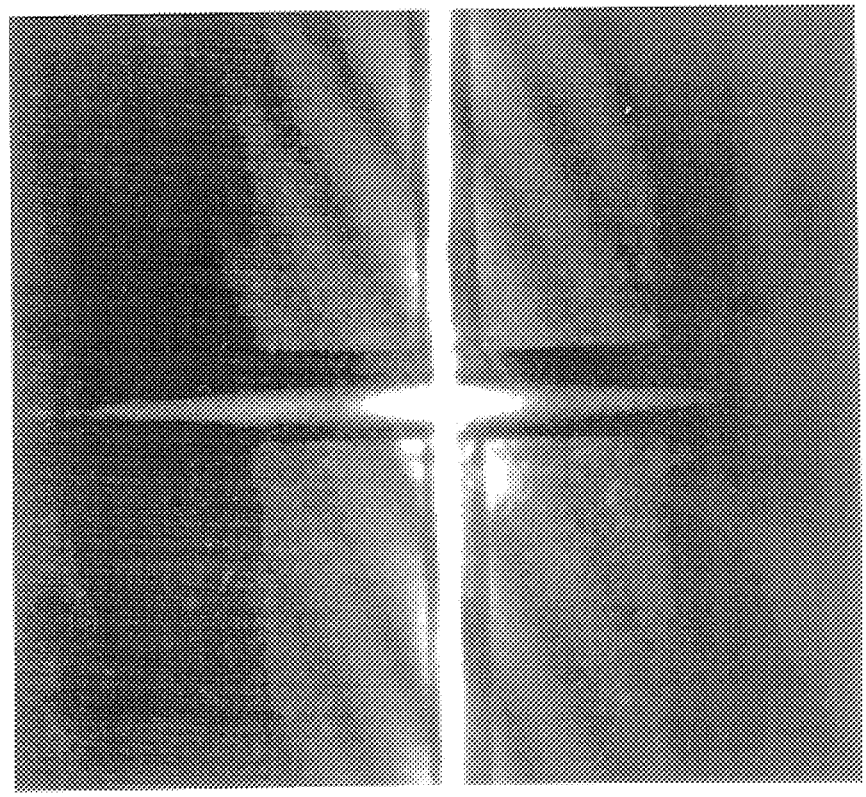
FIGS. 3A and 3B are pictures of diffraction lines formed from two mutually opposing fibre ends spaced a small distance apart, wherein Figure A shows the offset in a direction perpendicular to the laser beam and Figure B shows the offset along said laser beam.
Figure 3B:
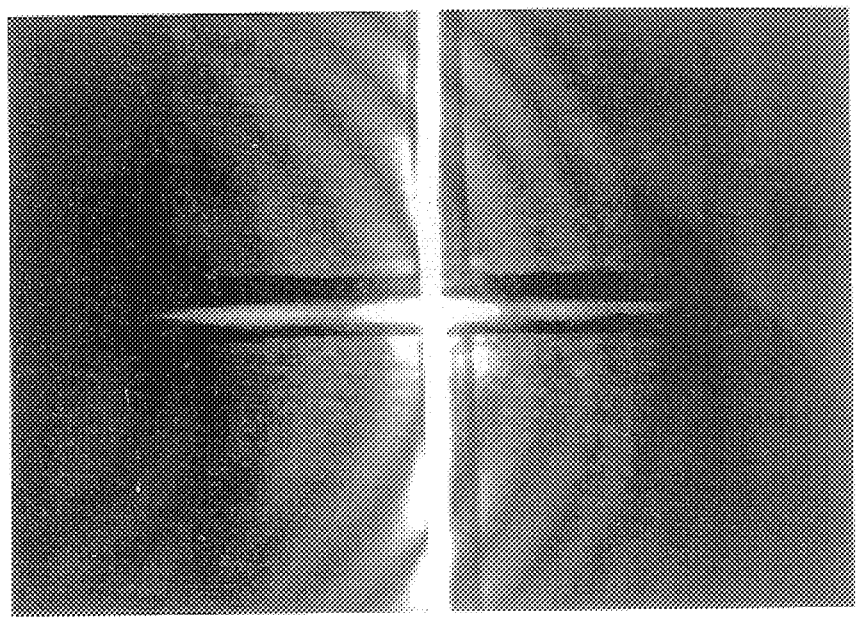

When the fibre ends are illuminated with one single light beam, the diffraction pattern cap be read in one single plane, which is fully sufficient to ascertain the position of the fibre ends in two perpendicular, radial directions within an area of 50 μm and with an accuracy and resolution of at least 0.5 μ. The collimated light from the laser 3 is focused onto the fibre ends with the aid of the lens 4. Each fibre end 1, 2 gives rise to two secondary light fields having pair-wise identical phase conditions. One field is formed as a result of the total reflection of the curved waves on the delimiting end surface within the fibre (R-field) and the other field is formed as a result of diffraction at the transition from fibre material to air at the rear side (K-field), as shown in FIG. 5. Superpositioning of these fields from two mutually abutting fibre ends generates a characteristic diffraction pattern and may, as such, be extended along a full observation plane, such as on a screen 6 located behind the cylinder ends, as shown in FIG. 4. As will be seen from FIGS. 2 and 3, the diffraction pattern is comprised of typical narrow Fraunhofer patterns in the middle of the screen with the diffraction lines as light, mutually parallel interference lines along the whole of the screen.

The angle of the diffraction lines to the y'-axis have been derived analytically as a function of the distance (Δz) of the cylinder ends and relative offset (Δx and Δy, offset) in two radial directions. These relationships are used by the computer for the automatic positioning of said cylinder ends.

The distance/gap, Δz, as a function of the distance of the dark lines to the y'-axis, z' and certain other parameters according to the following are determined by:

$$\Delta z = \frac{m\lambda}{\frac{z_m'}{\sqrt{D'^2 + z_m'^2}} - \frac{\alpha \cdot D\tan\beta}{r_0}} - \Delta z_0$$

$$|m| = 1,2,3,\ldots$$

where
 λ=the light wavelength
 D=perpendicular distance between light source and aperture
 D'=distance between fibre ends and observation plane
 $r_O$=distance between points in the light source and the centre of the aperture
 β=the divergence angle of incident light
 α=refraction indexes for different media through which the light propagates The relative offset perpendicular to the incident light beam, Δy, as a function of the angle of the diffraction lines to the y'-axis and θ is determined by:

$$\Delta y = \frac{D' \cdot \lambda}{Z_m'} \cdot \frac{\tan(\phi_j - \phi_{j-1})}{\sin\phi_j - \sin\phi_{j-1}} \cdot \tan(\theta_{j \to j-1})$$

with the same designations as above and
where
 $Z'_m$=the mutual spacing of the diffraction lines
 ø=the diffraction angle of secondary light rays The relative offset along the incident light beam, Δx, as a function of the angle of the diffraction lines to the y'-axis, θ is determined by:

$$\Delta x = \frac{D' \cdot \lambda}{2 \cdot Z_m'} \cdot \frac{\tan(\phi_j - \phi_{j-1})}{\sin^2\phi_{j_2} - \sin^2\phi_{j-1_2}} \cdot \tan(\theta_{j \to j-1})$$

with the same designations as above.

Figure 6:
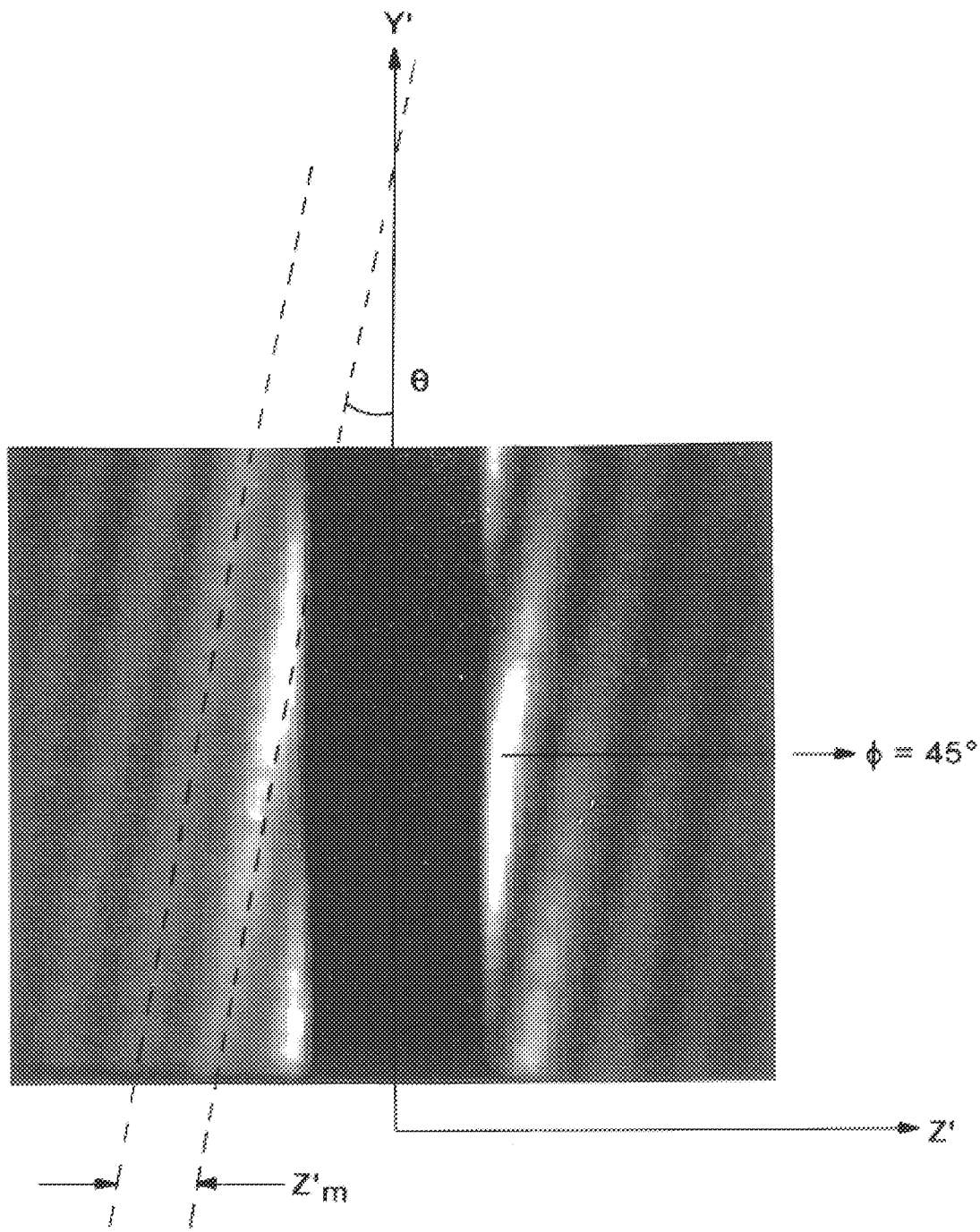
FIG. 6 is a picture of a diffraction pattern produced on a display screen and showing the angle defined by the diffraction lines with the y' axis, as shown by Δx and Δy.

FIG. 6 shows the diffraction pattern displayed on a display screen 6, wherein the distance between the fibre ends can be determined by the relative distance of the pattern and angle to the y-axis. The relative position of the fibre ends in each arbitrary position within a wide range of about 50 μm can be determined by measuring Z'm and θ on the display screen 6, situated over the optical axis, and inserting the measured values in the equations. Positive and negative offset of the cylinder ends, however, is shown in the diffraction lines and in the equations as positive and negative θ.

Subsequent to having determined the position of the two mutually opposing optical fibre ends and the distance between said ends and their relative offset, the control computer and the translators are able to calculate and set a suitable splicing distance between the fibre ends, whereafter splicing of said fibre ends can be effected in an automatic process. When the different parts described above are included in a fibre splicing machine, optical fibres can be spliced automatically and accurately, after determining distance and making distance adjustments.

I claim:

1. A method of determining the distance between two mutually opposing optical fibre ends prior to splicing the optical fibres, where one optical fibre end is spliced to another optical fibre end such as to form a homogenous splice with low damping, comprising the steps of:

projecting laser light onto ends of said two optical fibres, said laser light impinging on said optical fibres and creating an R-field and a K-field, wherein the superposition of said R-field and said K-field creates a diffraction pattern; and studying said diffraction pattern obtained from the fibre ends that have been illuminated with said laser light, and measuring distances between lines in the diffraction patterns, which distances are related directly to a distance between the fibre ends.

2. A method according to claim 1, additionally comprising a step for determining offset between said two mutually opposing optical fibre ends by measuring the slope of the lines in the diffraction pattern, wherein the measured slope is related directly to the offset between the geometric axes of the fibre ends.

3. A system for determining distance and offset between two mutually opposing optical fibre ends for use in splicing optical fibres, in which one optical fibre end is spliced with another optical fibre end to form a homogenous splice, said system comprising:

a light source which illuminates the fibre ends so as to produce an image having a diffraction pattern, wherein said diffraction pattern is produced by the superposition of a R-field and a K-field, which fields are produced when said light source impinges on said fibre ends;

means for receiving said image having said diffraction pattern; and means for transferring the diffraction image to an image processing and analysis means for determining distance between the fibre ends and the fibre offset.

4. A system according to claim 3, wherein the image processing and analysis means is a computer which is programmed to adjust the fibre ends to a correct distance and offset therebetween in accordance with the determined distance and offset between said ends, with the aid of a translator connected to the fibre ends.

5. A fibre splicing machine for splicing optical fibres, comprising:

fibre positioning means for positioning said optical fibres so that their end faces oppose each other;

splicing means for splicing said optical fibres;

a light source for illuminating said two mutually opposing optical fibre ends;

a screen for imaging a diffraction pattern formed by the superposition of a R-field and a K-field produced when said light source illuminates said optical fibre ends;

a measurement means for determining the distance and relative offset between the fibre ends by analyzing the pattern image; and means for setting a given distance between the fibre ends with regard to the determined distance and offset, prior to actuating the splicing means which splices the fibre ends together.

6. A system according to claim 3, wherein said light source comprises a laser light source.

7. A fibre splicing machine according to claim 5, wherein said light source comprises a laser light source.

8. A fibre splicing machine according to claim 5, wherein said measurement means comprises a computer.

9. A method according to claim 1, wherein said step of projecting said laser light projects a single beam of laser light onto both fibre ends.

10. A system according to claim 3, wherein said light source projects a single beam of laser light onto both fibre ends.

11. A fibre splicing machine according to claim 5, wherein said light source projects a single beam of laser light onto both fibre ends.

* * * * *

UNITED STATES PATENT AND TRADEMARK OFFICE
CERTIFICATE OF CORRECTION

PATENT NO. : 5,870,195
DATED : February 9, 1999
INVENTOR(S) : Sasan ESMAEILI

It is certified that error appears in the above-indentified patent and that said Letters Patent is hereby corrected as shown below:

On the title page, item [19] and item [75], delete "Esmaeili Sasan" and insert -- Sasan Esmaeili --.

Signed and Sealed this

Fourteenth Day of December, 1999

Attest:

Q. TODD DICKINSON

*Attesting Officer*   *Acting Commissioner of Patents and Trademarks*